(12) United States Patent  
Chen

(10) Patent No.: US 7,591,555 B1  
(45) Date of Patent: Sep. 22, 2009

(54) FRAMEWORK OF COMBINATION OF SPECTACLE FRAMES WITH LENSES

(76) Inventor: Lin Yun Chen, 1217 Beach Park Blvd., Foster City, CA (US) 94404

( * ) Notice: Subject to any disclaimer, the term of this patent is extended or adjusted under 35 U.S.C. 154(b) by 0 days.

(21) Appl. No.: 12/230,593

(22) Filed: Sep. 2, 2008

(51) Int. Cl.
*G02C 5/22* (2006.01)

(52) U.S. Cl. .................. 351/137; 351/76; 351/106; 351/136

(58) Field of Classification Search .......... 351/137, 351/76, 65, 136, 138, 139, 158, 41, 106, 351/103

See application file for complete search history.

(56) References Cited

U.S. PATENT DOCUMENTS

| | | | | |
|---|---|---|---|---|
| 4,280,758 A | * | 7/1981 | Flader et al. ................. | 351/55 |
| 5,159,359 A | * | 10/1992 | Pauly et al. ................. | 351/128 |
| 5,291,230 A | * | 3/1994 | Bradley ....................... | 351/88 |
| 5,971,538 A | * | 10/1999 | Heffner ...................... | 351/137 |
| 6,056,398 A | * | 5/2000 | Negishi ....................... | 351/55 |
| 6,554,422 B2 | * | 4/2003 | Bell ............................ | 351/128 |

\* cited by examiner

*Primary Examiner*—Hung X Dang

(57) ABSTRACT

A framework of combination of spectacle frames with lenses comprises a spectacle frame provided with an upper arm and assembled with a nosepiece, in which a hole seat is formed between the upper arm and the nosepiece and a wedge hole is formed inside the hole seat; a lens provided with a neck, in which adjustment of multiple segments may be made for clamping by using a gibbous wedge of the nosepiece that is arranged in the wedge hole, and a distance between the gibbous wedge and the upper arm may be adjusted for the tight fitness of lens. The lens may be easily assembled into the spectacle frame, and the issue on adjustment of fitness without any segment due to easy assembly.

7 Claims, 6 Drawing Sheets

A-A

FRAMEWORK OF COMBINATION OF SPECTACLE FRAMES WITH LENSES

BACKGROUND OF THE INVENTION

1. Field of the Invention

This invention relates to a framework of combination of spectacle frames with lenses and particularly to that of the spectacle frames of which the tightness is adjustable, with lenses.

2. Description of the Related Art

Glasses are generally provided for eyesight correction in the field of optics, or sunshine shielding, wind force resistance, or artistic decoration. A pair of conventional glasses mainly comprises a pair of spectacle frames and lenses mounted onto the frames, and go with temples that are set onto ears. The main parts are increasingly improved on design, so one or more parts may be replaced; for example, the lenses may be removed and then mounted, the temples may be replaced and the like.

For example, this invention has more relation to Taiwan Patent No. I268384 that is titled "Spectacles Provided with Lenses Easily Replaceable", and to Taiwan Patent No. M294661 that is titled "Spectacles Provided with Lenses Replaceable". From what is disclosed above, the spectacle frames and the lenses may be easily removed for replacement. However, the lenses are easily removed for replacement, and in order to be easily combined with the frames, the lenses are not easily adjusted for tightness. Thus, after being used for a period of time, because being caused by its material, the lenses might deform or loosen and thus be worked out.

Further, this invention has relation to Taiwan Patent No. M272099 that is titled "Framework of Adjustment of a Nose Cushion for a Height, in which the framework comprises a nose cushion provided at the middle section of a pair of glasses; a fitting slot where a nose cushion is set is formed at the middle section of the glasses, and a locating hole of the glasses is limited by and wedges to a protruding portion of a nose cushion holder, in which two sides of the nose cushion holder stretch to clamp a junction section formed in the soft nose cushion by using a junction portion. Accordingly, when wearing the glasses, a user may easily adjust the nose cushion on the height of a bridge of nose for steadiness and compatibility.

However, in the prior art that is disclosed, generally, the spectacle frames may be provided with locating holes for replacing and locating the nose cushions and adjusting their height. No proper structure is provided between the spectacle frames and the lenses for removal and replacement. Thus, it is not helpful to solve the issue on removal, installation, and fitness of the lenses.

Consequently, because of the technical defects of described above, the applicant keeps on carving unflaggingly through wholehearted experience and research to develop the present invention, which can effectively improve the defects described above.

SUMMARY OF THE INVENTION

In consideration of the mentioned-above defects of prior art, an improved structure according to this invention is provided to make achieve easy removal, installation, and fitness.

Thus, a framework of combination of spectacle frames with lenses is provided. The framework of combination of the spectacle frames with the lenses comprises a pair of spectacle frames. The spectacle frame comprises a upper arm and joins together with a nose piece. A hole seat is formed between the hemline of upper arm and the nose piece, and a wedge hole is formed inside the hole seat. Inside the wedge hole, at least one section is formed, and a first wide portion, a first narrow portion, and a second wide portion are formed from top to bottom in sequence. The top end of nose piece is connected to a gibbous wedge. Further, the width of gibbous wedge is smaller than the first wide portion of wedge hole and larger than the second wide portion and slightly larger than the first narrow portion of wedge hole to make the gibbous wedge to be brought into the first wide portion and then constrain the first narrow portion and thus locate in the second wide portion. A distance between the gibbous wedge and the upper arm may be adjusted. Further, a groove of which the mouth is downward is formed at the hemline of upper arm near the outside. A support portion is formed stretching from the nosepiece, at which a support slot of which the mouth is upward is formed. A lens of integral whole comprises two units of lenses between which a junction is formed into a neck. The neck is arranged between the groove and the support slot. Thus, the lens may be easily assembled into the spectacle frame, and the issue on adjustment of fitness without any segment due to easy assembly.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
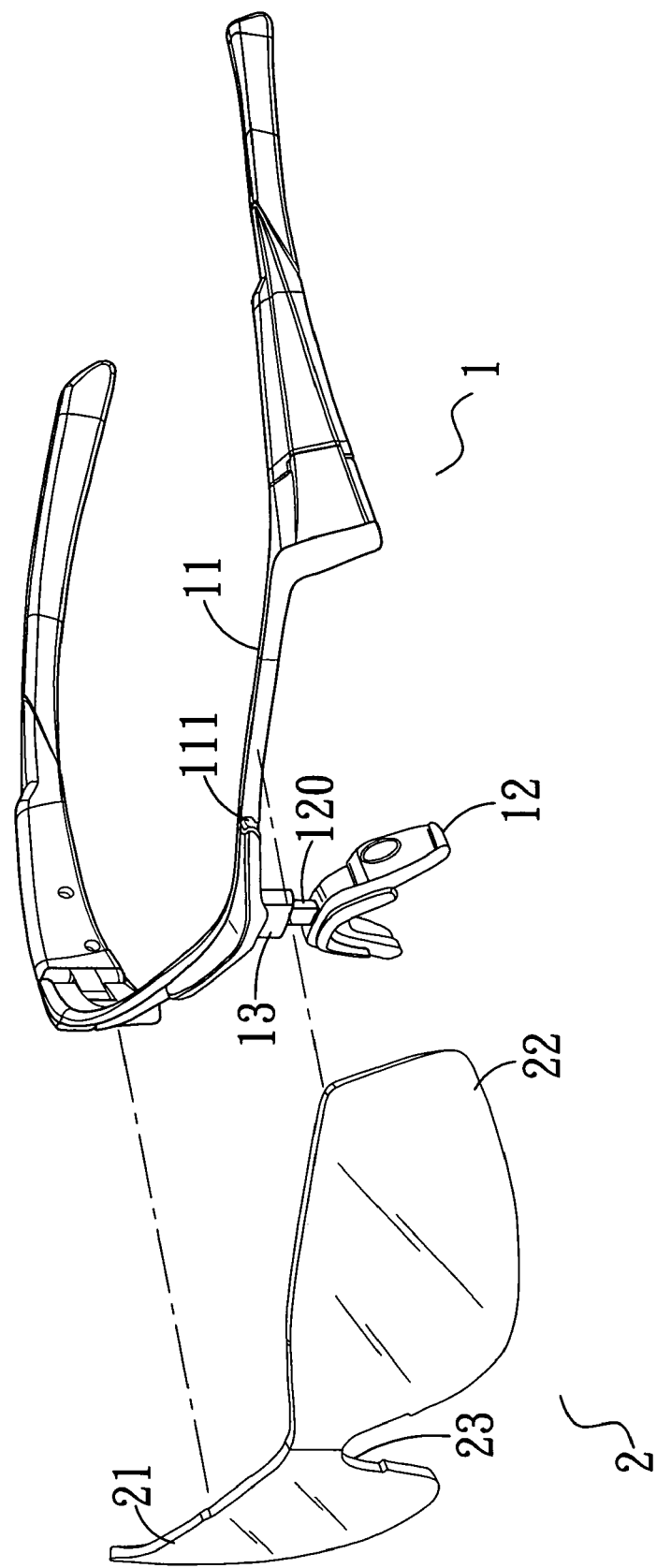
FIG. 1 is an exploded view of this invention.
Figure 2:
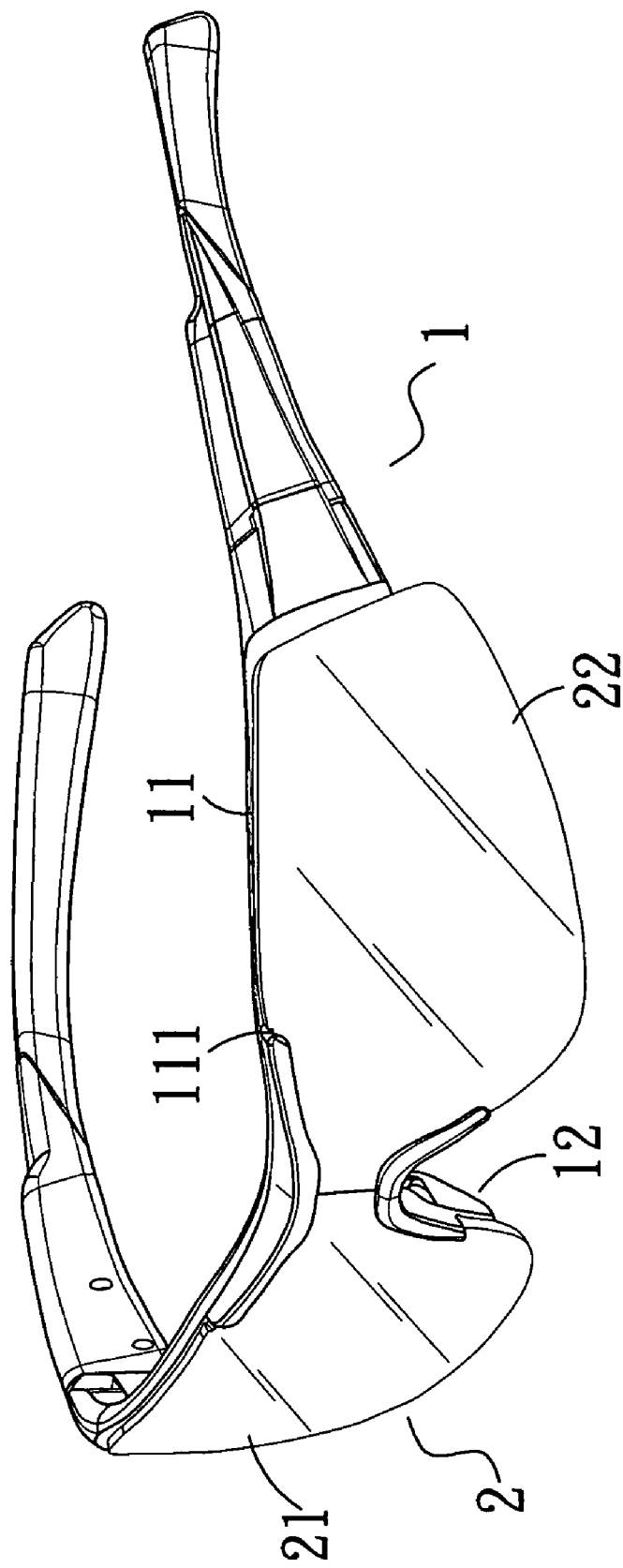
FIG. 2 is a 3D assembly drawing of this invention.

With reference to FIGS. 1 and 2, a framework according to this invention comprises a spectacle frame (1) and a lens (2).

Figure 3:
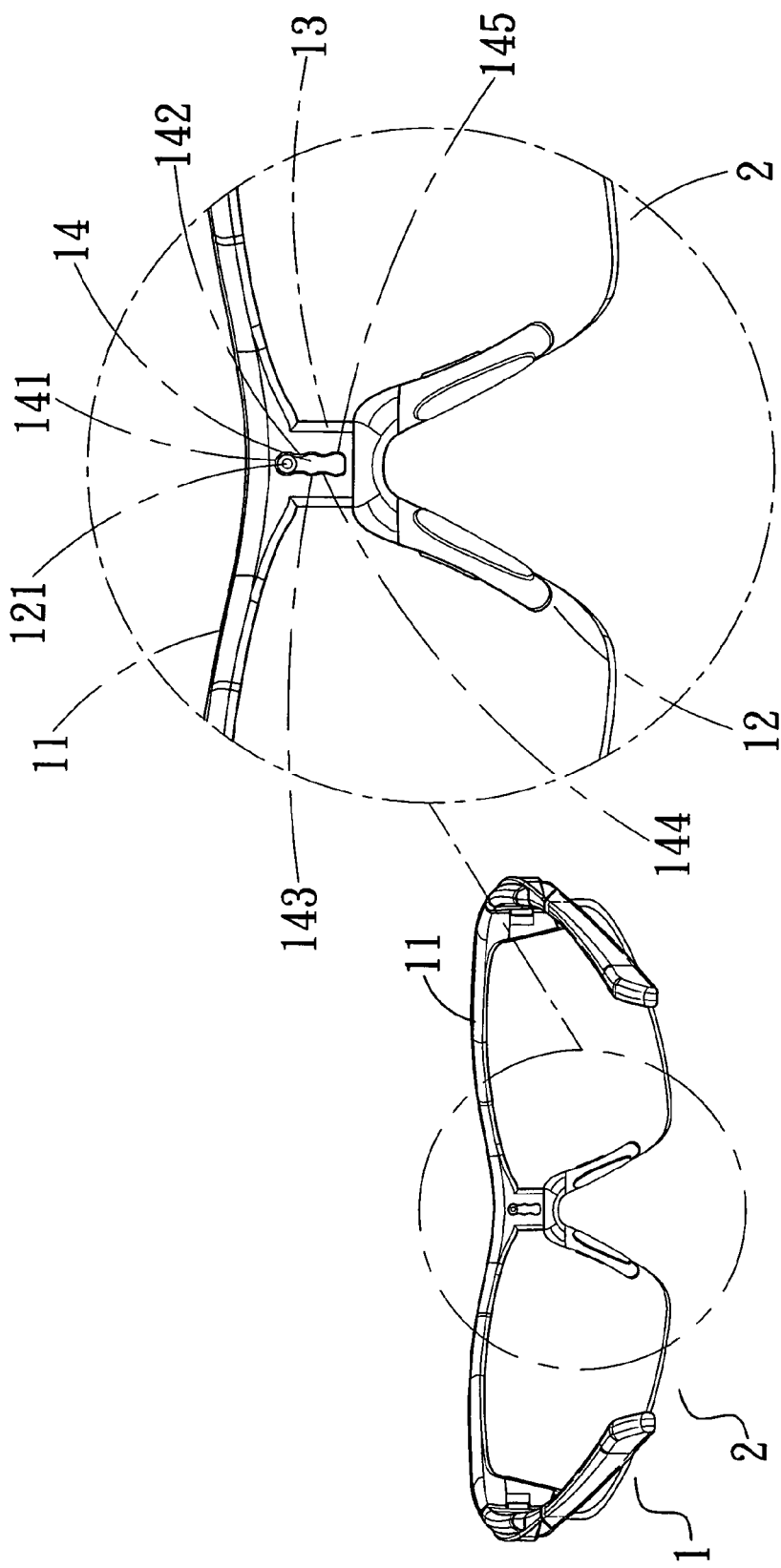
FIG. 3 is a schematic view illustrating a gibbous wedge assembled into a wedge hole.
Figure 4:
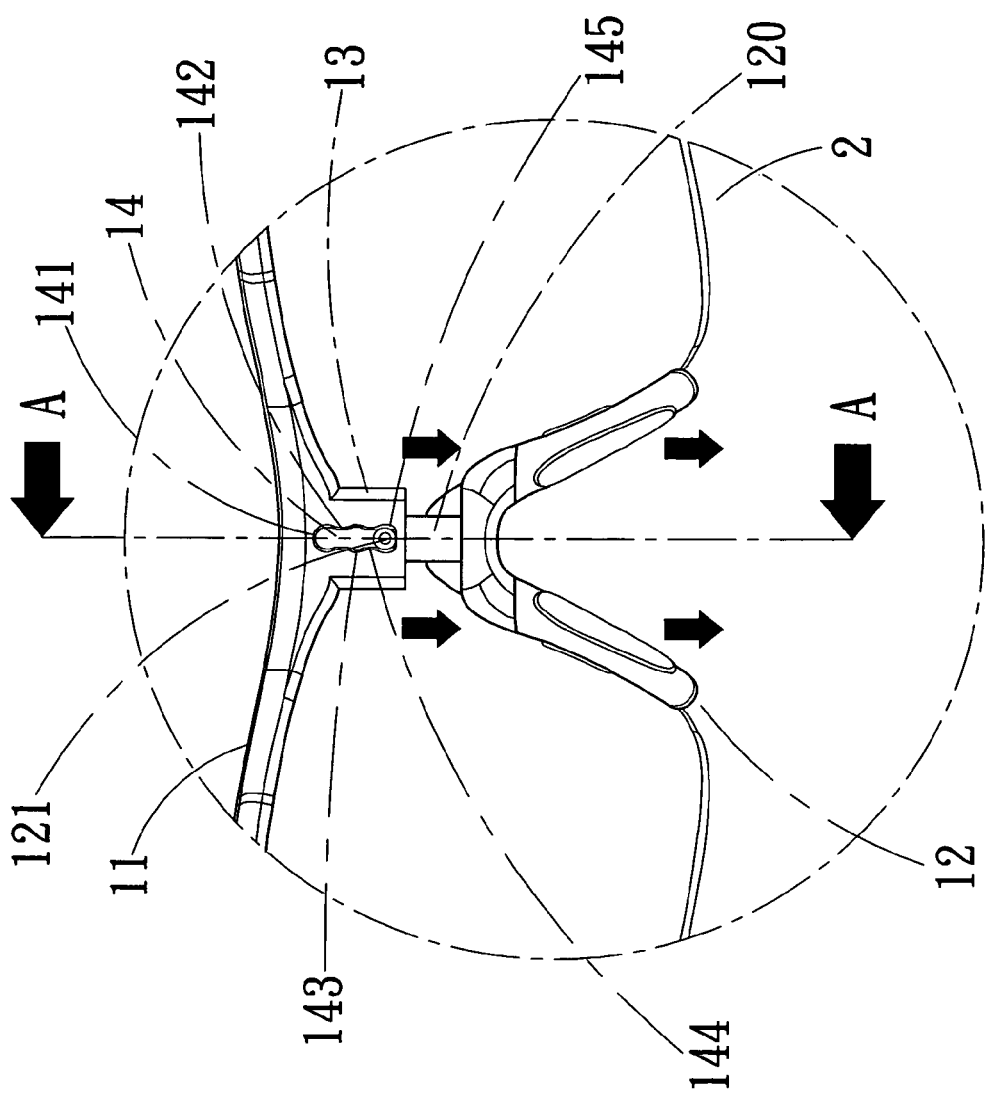
FIG. 4 is a schematic view illustrating the gibbous wedge working in the wedge hole.
Figure 5:
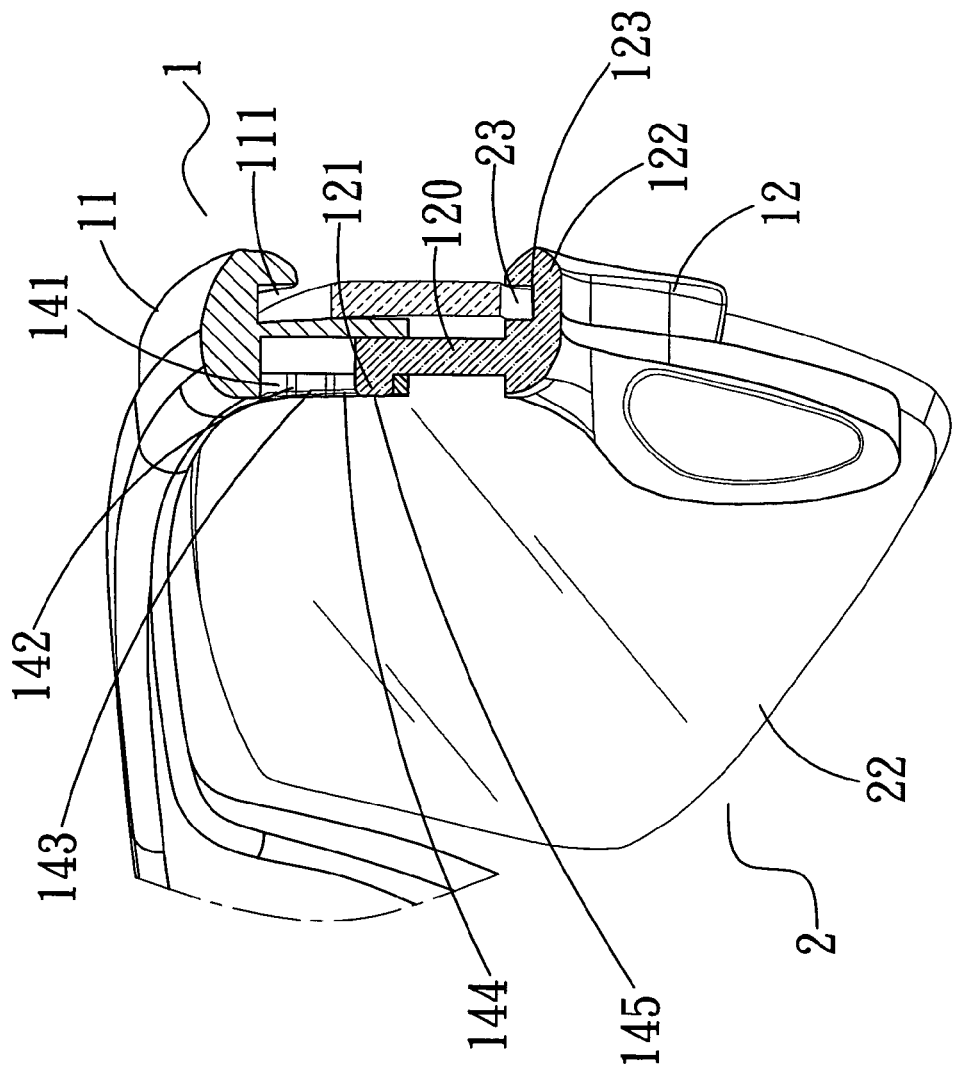
FIG. 5 is a view of section A-A of FIG. 4.

With reference to FIGS. 3 through 5, the spectacle frame (1) according to this invention comprises an upper arm (11) and joins together with a nosepiece. A hole seat (13) is formed between the hemline of upper arm (11) and the nosepiece (12), and a wedge hole (14) is formed inside the hole seat (13). Inside the wedge hole (14), at least one section is formed, and a first wide portion (141), a first narrow portion (142), and a second wide portion (143) are formed from top to bottom in sequence. The top end of nosepiece (12) is connected to a gibbous wedge (121). Further, the width of gibbous wedge (121) is smaller than the first wide portion (141) of wedge hole (14) and larger than the second wide portion (143) and slightly larger than the first narrow portion (142) of wedge hole (14). From the top of first wide portion (141), a second narrow portion (not shown) may further stretch. A third narrow portion (144) may further stretch from a lower part of the second wide portion (143), and even a third wide portion (145) may also stretch from a lower part of the third narrow portion (144) and so on. Further, with reference to FIG. 5, a groove (111) of which the mouth is downward is formed at the hemline of upper arm (11) near the outside. A support portion (122) is formed stretching from the nosepiece (12), at which a support slot (123) of which the mouth is upward is formed.

With reference to FIG. 4, the gibbous wedge (121) may be brought into the first wide portion (141) and then pass with an elastic material through the first narrow portion (142), the second wide portion (143), and the third narrow portion (144) and thus locate in the third wide portion (145). Then, the gibbous wedge (121) may function in the wedge hole (14) for adjustment of the height and the distance from the upper arm (11).

Further, in this invention, a lens (2) of integral whole is further provided, as shown in FIGS. 1 and 2 and comprises two units of lenses (21) and (22) between which a junction is formed into a neck (23). With cross-reference to FIG. 5, the neck (23) is arranged between the groove (111) and the support slot (123). With reference to FIG. 4, the gibbous wedge (121) may function in the wedge hole (14) for adjustment of the height and the distance from the upper arm (11). The support portion (122) and support slot (123) that stretch from the nosepiece (12) are adjusted for the distance from the upper arm (11). Again, the lens (2) is supported by the support slot (123), so the distance between the lens (2) and the upper arm (11) may be adjusted to tightly fit the lens (2) with levels of segments.

The effect of fitness and the degree of tightness may depend on the width and size of gibbous wedge (121) and the width of corresponding wedge hole (14) or the amount of wide and narrow portions.

Further, it is nevertheless especially noted that, although being illustrated in the figure, the inner width of wedge hole (14) is given by continuous crooks formed at two sides. However, in the embodiment, the width may also depend on a vertical side and a continuously crooked side.

Figure 6:
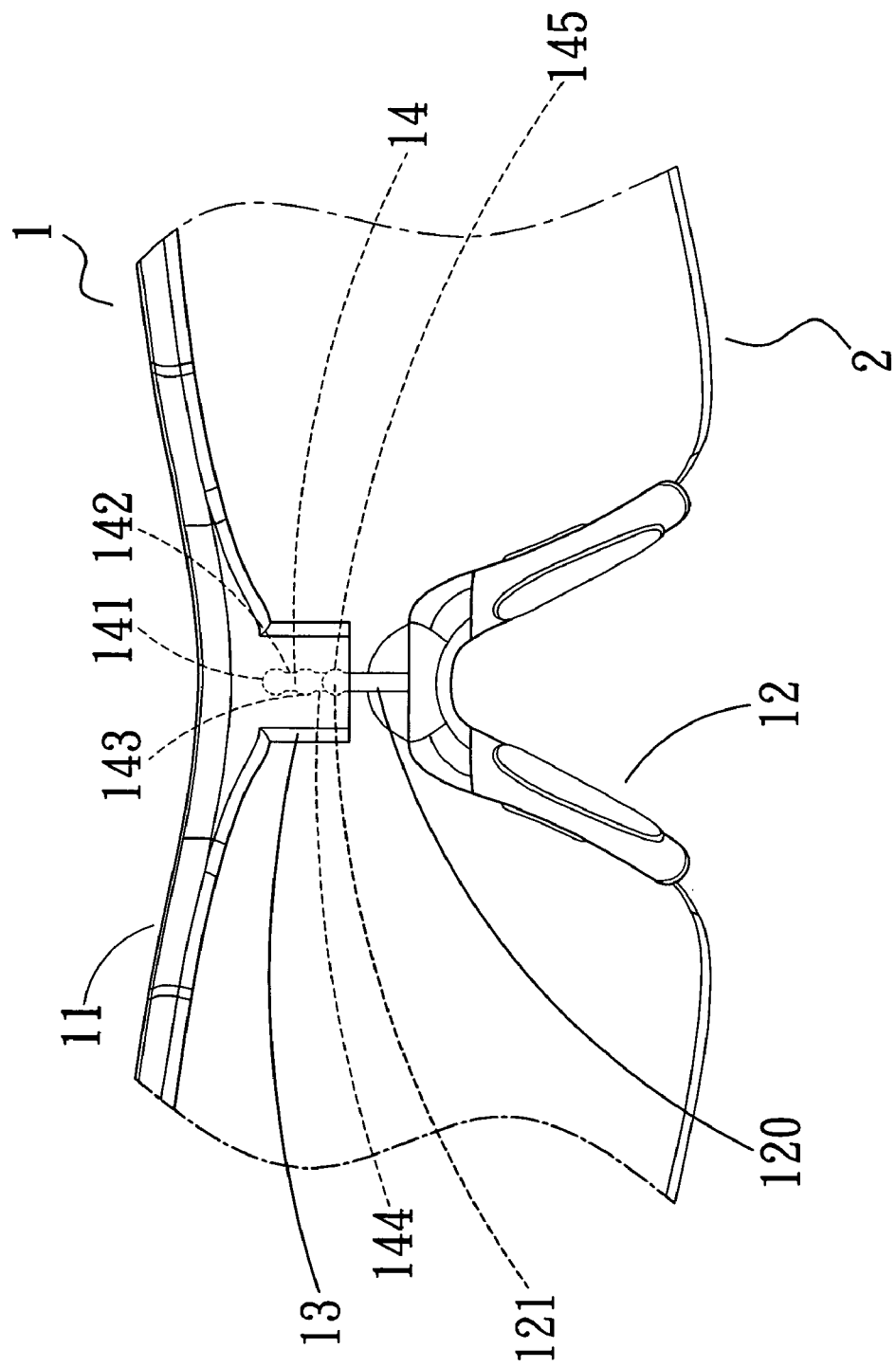
FIG. 6 is an embodiment of this invention.

The gibbous wedge (121) connected to the top of nosepiece (12) according to this invention may be provided at the inner side of a connection rod (120) stretching from the top of nosepiece (12), as shown in FIGS. 4 and 5. As shown in FIG. 6, the gibbous wedge (121) may also be formed with a comparatively wider portion given by the width of connection rod (120) stretching from the top of nosepiece (12).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A framework of combination of spectacle frames with lenses, comprising:

a spectacle frame comprising an upper arm and joining together with a nosepiece, in which a hole seat is formed between the hemline of upper arm and the nosepiece, a wedge hole is formed inside the hole seat, at least one section is formed inside the wedge hole, and a first wide portion, a first narrow portion, and a second wide portion are formed from top to bottom in sequence;

a gibbous wedge being provided that connects to the top end of nosepiece; the width of gibbous wedge being smaller than the first wide portion of wedge hole and larger than the second wide portion and slightly larger than the first narrow portion of wedge hole to make the gibbous wedge to be brought into the first wide portion and then constrain the first narrow portion and thus locate in the second wide portion; a distance between the gibbous wedge and the upper arm being adjusted; a groove of which the mouth being downward is formed at the hemline of upper arm near the outside; a support portion being formed that stretches from the nosepiece, at which a support slot of which the mouth is upward is formed;

and a lens of integral whole comprising two units of lenses between which a junction is formed into a neck arranged between the groove and the support slot.

2. The framework of combination of the spectacle frames with the lenses according to claim 1, wherein the gibbous wedge connected to the top of nosepiece is provided at the inner side of a connection rod stretching from the top of nosepiece.

3. The framework of combination of the spectacle frames with the lenses according to claim 1, wherein the gibbous wedge connected to the top of nosepiece is formed by the width of connection rod stretching from the top of nosepiece.

4. The framework of combination of the spectacle frames with the lenses according to claim 1, wherein the inner width of wedge hole is given by continuous crooks formed at one side.

5. The framework of combination of the spectacle frames with the lenses according to claim 1, wherein the inner width of wedge hole is given by continuous crooks formed at two sides.

6. The framework of combination of the spectacle frames with the lenses according to claim 1, wherein a second narrow portion is provided stretching from the top of first wide portion inside the wedge hole.

7. The framework of combination of the spectacle frames with the lenses according to claim 1, wherein a third narrow portion is provided stretching from the lower part of second wide portion inside the wedge hole.

* * * * *